Feb. 24, 1931.  W. P. SHEPHERD  1,793,565
DRAG TOY
Filed March 5, 1929
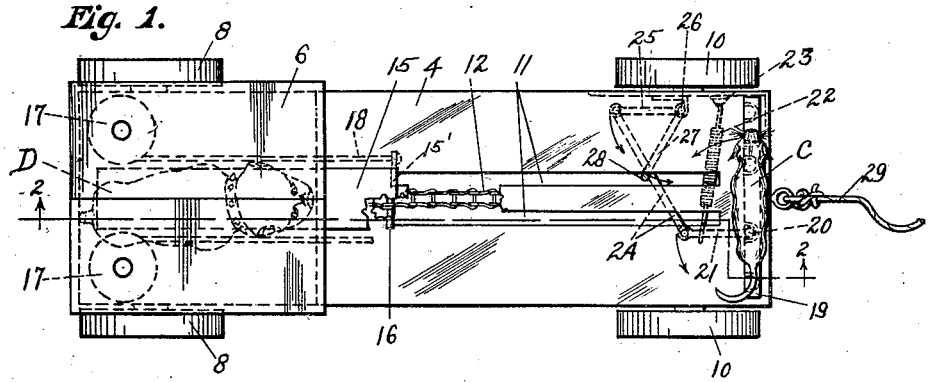
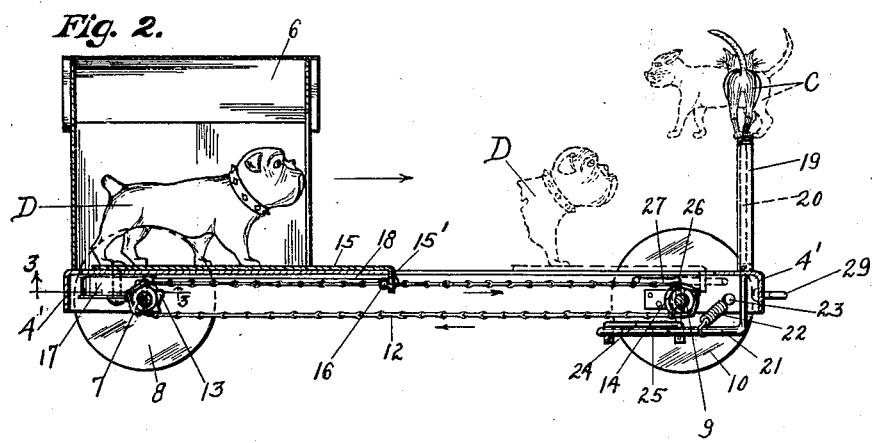
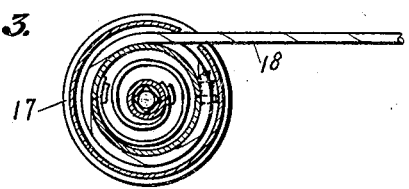
INVENTOR.
Winfred P. Shepherd
BY
ATTORNEYS.

Patented Feb. 24, 1931

1,793,565

UNITED STATES PATENT OFFICE

WINFRED P. SHEPHERD, OF PASADENA, CALIFORNIA

DRAG TOY

Application filed March 5, 1929. Serial No. 344,207.

My invention relates to drag toys and more particularly to a drag toy which automatically causes action to take place as it is moved along upon the floor or other surface, as when it is being pulled by means of a cord.

One of the principal objects of my invention is to produce a drag toy in which the representation of an animal is caused to make certain movements with means for causing an accelerated or surprise movement at a predetermined time; such action being intermittently repeated as said toy is moved.

Another object of my invention is to provide in such a drag toy, a second animal or object adapted to be moved in conjunction with the accelerated movement of the first animal, whereby to relate the movement of the second animal or object to the accelerated movement of the first animal.

In order to explain my invention, I have illustrated the same on the accompanying sheet of drawings in which I have used a dog as the first animal and a cat on a fence as the second animal or object. In the drawings,—

Figure 1 is a top plan view of a drag toy embodying my invention;

Figure 2 is a longitudinal sectional view thereof, taken on the line 2—2 of Fig. 1; and Figure 3 is a sectional view through one of the spring motors for imparting an accelerated movement to the animal.

Referring to the drawings in detail, 4 designates a floor or platform, with a dog kennel or house 6 on the rear end thereof, with rear axle 7 and rear wheels, 8, 8, and a front axle 9, and front wheels, 10, 10. The platform is preferably made of sheet metal with its edges turned down to form a surrounding flange 4', and the platform is shown provided with two parallel slots, 11, 11, extending longitudinally from the front end to a point in front of the dog house, substantially as shown. A sprocket chain 12, is placed around two small sprockets 13, 14, on the rear and front axles, whereby the movement of said toy on its wheels operates said endless sprocket chain in the direction of the arrows associated therewith. Slidably mounted upon the platform 4, is a carrier plate or member 15, having its forward end turned down at opposite sides, as at 15', to extend down into the parallel slots 11, 11, in position to be caught by a pin 16, on the sprocket chain 12, as it comes around the rear sprocket 13 and moves forwardly.

Mounted on the underside of the platform 4, at the rear, are two spring motors, 17, 17, with cables 18, 18, wound therein and attached at their outer ends to the front of the member 15, as indicated in light broken lines in Fig. 1. On said plate or member 15 is the representation of a dog D, moving with said member.

Mounted on the front end of said platform 4, is the representation of a fence or structure 19, on which is the representation of a cat C, carried at the upper end of a rod 20, extended down through said structure 19, and bent to an angle 21, under said platform 4. A coiled spring 22 is attached to the side of the platform, as at 23, and to said angle 21, substantially as shown to normally hold said cat in the position shown in full lines. A rocker arm 24 connects at one end to the end of said angle rod 21, and at its other end to the end of a lower arm 25, bent upwardly to form a bearing 26, with its upper end bent to an angle 27, and its end projecting at 28 into the slot 11, in position to be engaged and moved by the front end of the member 15, when it reaches that forward position. This operates to move the connected arms or rods 21, 24, 25 and 27 in the directions indicated by the little arrows in Fig. 1, and thus moving the cat around to the position indicated in light broken lines in Fig. 2. A pull cord 29 is attached to the forward end of the toy for moving it on the floor.

The operation may be briefly described as follows.

As the toy is moved forwardly, the sprocket chain 12 is moved until the cross pin 16 carried thereby engages the depending ends 15' of the plate or member 15, carrying the dog D, and moves said plate and dog out to the position indicated in light broken lines in Fig. 2, at the same time placing the spring motors 17, 17, under tension as the cables 18, are withdrawn. As the pin 16, on the chain turns down around the forward sprocket 14, the pin moves down from behind the depending ends 15', thereby releasing the carrier plate 15, whereupon the dog is carried back into the kennel with an accelerated movement, where he remains until the pin 16 makes another round of sprocket 13 and moves forwardly again to repeat the action. During this movement, the plate 15, at its forward end has engaged and moved the end 28, of the arm 27, and through the connections above mentioned, has moved the cat to the dotted line position. This movement of the cat is timed to take place just as the dog is released and jumps back into his kennel. This action is intermittently repeated as the toy is moved forwardly.

I am aware that changes can be made in the construction and arrangement here shown for descriptive purposes, and I do not limit my invention to this showing, except as I may be limited by the hereto appended claims.

I claim:

1. In a drag toy, a body mounted to be moved, an animal representation movably mounted on said body, operating connections for intermittently moving said animal representation uniformly along said body as said body is moved upon the floor, a second animal representation movably supported in front of said first animal representation, and independently movable means operated by the final forward movement of said first animal representation to cause the independent movement of the second animal representation, and means for causing an independent accelerated return movement of said first animal representation.

2. In a device of the character referred to, a body movable on a floor, a plurality of animal representations movably mounted on said body, operating connections for imparting separate movements to said animal representations on said body as said body is moved upon the floor, means for causing an accelerated return movement of one of said animal representations at a predetermined time during its regular movement, and means operated by the final forward movement of said first animal representation for causing an attacking movement of another of said animal representations immediately preceding the accelerated return movement of the one animal representation, whereby the movement of said other animal representation appears to be the cause of the accelerated return movement of the one.

3. In a drag toy, a body movable on wheels, a dog house thereon, a dog representation therein, means for moving the dog out of said dog house, a cat representation movably mounted out in front of said dog house, operating connections from said toy carrying mechanism for moving said cat representation a predetermined distance with the final movement of said dog out of said dog house, and means for causing an accelerated movement of said dog back into said dog house as said cat representation moves.

4. A drag toy comprising in combination a body mounted to move on wheels, an animal representation movably mounted on said body, operating connections for moving said animal representation along said body as said body is moved on the floor, means connected with said animal representation put under tension as said animal representation is moved on said body for returning the same quickly, releasing means for releasing said animal representation at the limit of its regular movement, whereby an accelerated return movement of said animal representation is caused to take place, and an independent movable object mounted to be more quickly moved by the mechanism moving said animal representation as the latter reaches the limit of its forward movement, whereby the movement of said object represents the cause of an accelerated return movement of said animal representation.

5. In a drag toy, in combination, a body on wheels, a dog house, a dog in said house, a structure in front of said house on said body, a cat on said structure rotatably supported, means operated by the movement of said toy body for moving said dog out of said dog house toward said structure, means operated by the movement of said toy for turning said cat on said structure, and means for causing an accelerated return movement of said dog into said dog house as said cat moves on said structure.

6. In a toy, a wheeled structure to move on the floor, an animal representation movably mounted on said structure, operating connections from the wheels to said animal representation for moving it on said structure, means connected with said animal representation adapted to be put under tension for returning it quickly as said animal representation is moved, means for releasing said animal representation at the end of its forward movement whereby to permit an accelerated return movement of said animal representation to its starting position, an independent second movable object on said structure connected to be intermittently moved during the movement forward of said animal representation, whereby the movement of said object is related to the accelerated return movement of said animal representation, and means for moving said toy.

7. In a toy having a platform and wheels to move upon a floor, two representations of animals mounted to be moved relative to each other upon said platform, with operating connections to the wheels for moving said representations, one of said animal representations being connected with means for intermittently moving it uniformly in one direction for a predetermined distance with means for intermittently moving it in the opposite direction with an accelerated movement at the limit of said predetermined movement, the other of said animal representations being connected to be moved intermittently in a different direction in relation to the movement of said first animal representation by different connections to give it an accelerated movement following the accelerated movement of said first animal.

Signed at Los Angeles, Los Angeles County, California, this 28th day of February, 1929.

WINFRED P. SHEPHERD.